United States Patent [19]

Szmidla

[11] Patent Number: 5,415,553
[45] Date of Patent: May 16, 1995

[54] DEVICE FOR IDENTIFYING AN OBJECT USING AN OMNIDIRECTIONAL BAR CODE

[76] Inventor: Andrew Szmidla, 76 Patshull Road, London NW5 2LD, Great Britain

[21] Appl. No.: 152,018

[22] Filed: Nov. 15, 1993

[30] Foreign Application Priority Data

Nov. 13, 1992 [GB] United Kingdom ............... 9223861

[51] Int. Cl.6 .............................................. G09B 5/06
[52] U.S. Cl. .................... 434/309; 434/311; 235/494
[58] Field of Search ............... 434/312, 313, 112, 116, 434/311, 308, 309, 310, 317, 318; 235/494

[56] References Cited

U.S. PATENT DOCUMENTS

| 2,612,994 | 10/1952 | Woodland et al. | 235/494 |
| 3,970,803 | 7/1976 | Kinzie, Jr. et al. | 434/313 |
| 4,337,375 | 6/1982 | Freeman | 434/313 |
| 4,505,682 | 3/1985 | Thompson . | |
| 4,602,152 | 7/1986 | Dittakavi | 434/317 |
| 4,904,853 | 2/1990 | Yokokawa | 235/494 |
| 4,994,987 | 2/1991 | Baldwin | 434/311 |

FOREIGN PATENT DOCUMENTS

| 177174 | 7/1989 | Japan | 235/494 |
| 275488 | 10/1990 | Japan | 434/308 |
| 2016783 | 9/1979 | United Kingdom . | |
| 2215110 | 9/1989 | United Kingdom | 434/308 |
| 2265489 | 9/1993 | United Kingdom . | |
| 83/02188 | 6/1983 | WIPO . | |
| 91/17535 | 11/1991 | WIPO . | |

Primary Examiner—Todd E. Manahan
Attorney, Agent, or Firm—Larson & Taylor

[57] ABSTRACT

A device for identifying an object includes a graphic representation of an object and an omnidirectional bar code representing information relative to the object. The bar code is made up of a sequence of light and dark lines arranged as closed concentric curves. The shape of the curves corresponds to the outline of the object. Using a bar code reader connected to a transducer for converting the bar code into humanly detectable signals, the user can scan the bar code in any direction to learn the name of the object or other information about the object.

9 Claims, 3 Drawing Sheets

DEVICE FOR IDENTIFYING AN OBJECT USING AN OMNIDIRECTIONAL BAR CODE

FIELD OF THE INVENTION

The present invention relates to a device for identifying and obtaining information about an object and, more particularly, to a device which identifies an object or components thereof using an omnidirectional bar code having the same shape as the object.

BACKGROUND OF THE INVENTION

Several educational aids are known in which representations of objects are associated with the names of respective objects. For example, a child may be taught to spell by printing on the page of a book, a picture of an apple, and printing the word apple alongside the picture. Similarly, a vocabulary in a foreign language can be acquired by learning the foreign language names printed alongside the representations of respective objects.

SUMMARY OF THE INVENTION

According to the invention there is provided a document including the representation of an object and an identification code, a code reader and a transducer device for converting the output of the code reader into humanly detectable (such as audio or visual) signals representing the word describing the object. The identification code may be visible, such as a printed bar code, or invisible, such as a magnetized strip. The transducer preferably comprises a microprocessor having a store, means to compare the output of the code reader with signals in the store and to select the closet signal, and means to generate the detectable signal in response to the selected signal. A visual signal can be shown, for example, on a LCD display. The audio signal may be generated by a speech synthesizer.

A code is a way of representing information. In a bar code, a pattern of light and dark lines is used to do this. A scanner converts this pattern into electrical impulses which are interpreted by a bar code reader. The information in a bar code is stored in a linear form and the pattern needs to be scanned from one end to the other in order to be read correctly. Most bar codes are now bi-directional and the bar code itself can be scanned from both left to right and right to left. The scanning device can either be pulled across the bar code from one end to the other, or, as in the case of a moving beam scanner, the scanner moves a light beam across the bar code. In both beam scanners, the scanner moves a light beam across the bar code. In both cases, the alignment between the axis of the bar code and the movement of the scanner or scanning beam is a critical factor. In situations where this alignment is practically difficult to achieve, as in supermarket checkouts, multiple moving beam scanners have been developed to deal with the problem. By their nature they are bulky, large, and necessarily stationary devices. This invention proposes to use an entirely different approach to the problem of aligning the printed code and the scanning beam by using an omnidirectional symbology of a linear symbology. In a linear symbology, the code is a series of light and dark vertical lines arranged in sequence in a straight line in space. The omnidirectional code substitutes for this a series of light and dark lines arranged in sequence as rings one within another. A ring is defined herein as a closed curve, not necessarily a circle. A scanner's beam cutting across the circumference will be able to read the information irrespective of the direction from which it intersects the rings as they will always be in the same sequence and the alignment is no longer a critical issue. The only critical feature is that the scan must intersect the smallest ring if the whole code is to be read, but by making the significance of the code elements correspond to their distance from the centre, then a reasonably accurate reading of such a code will be achieved even if a few of the innermost rings are not scanned. A partly read code will at least give an idea of the generic nature of the object, if not its full classification.

This type of code lends itself to the educational apparatus described above, although it clearly has independent utility. A conventional bar code will be located adjacent the object on the document to which it relates, but there is always the chance that the user will be confused as to which code relates to which object. The improved closed ring code can be arranged so that its rings encircle the object itself, so that by scanning the object the user will scan the code automatically. This will avoid any confusion between the relationship of code to object. The direction of scan is not significant. The rings can be printed, but to avoid "cluttering up" the representations on the document, invisible codes (such as magnetic patterns) may be preferred.

Another advantage of the ring codes is that the inner rings may be used to denote components of the object denoted by the outer rings. For example, the document may show a car (automobile) with a door and a handle on the door. The innermost rings of the code will be located encircling the handle, the middle rings will be located to encircle the door and the outer rings will encircle the car. If all the rings are scanned, the display (audio or visual) will be of a car door handle; if the innermost rings are bypassed the display will be of a car door; and if only the outer rings are scanned, the display will be of the car alone.

BRIEF DESCRIPTION OF THE DRAWINGS

An example of the invention will now be described with reference to the accompanying drawings in which.

DESCRIPTION OF THE PREFERRED EMBODIMENTS

Figure 1:
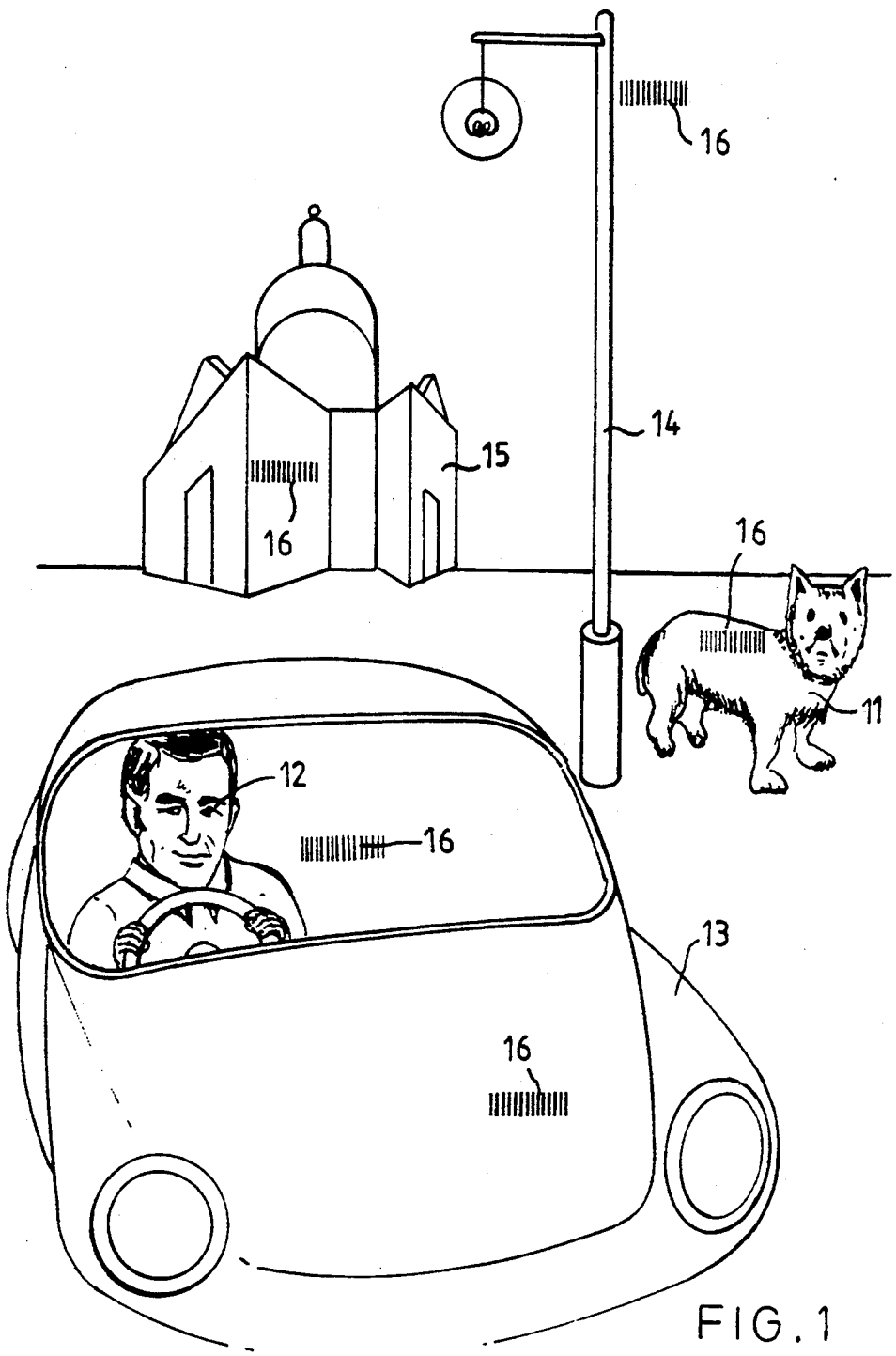
FIG. 1 is a document.
Figure 2:
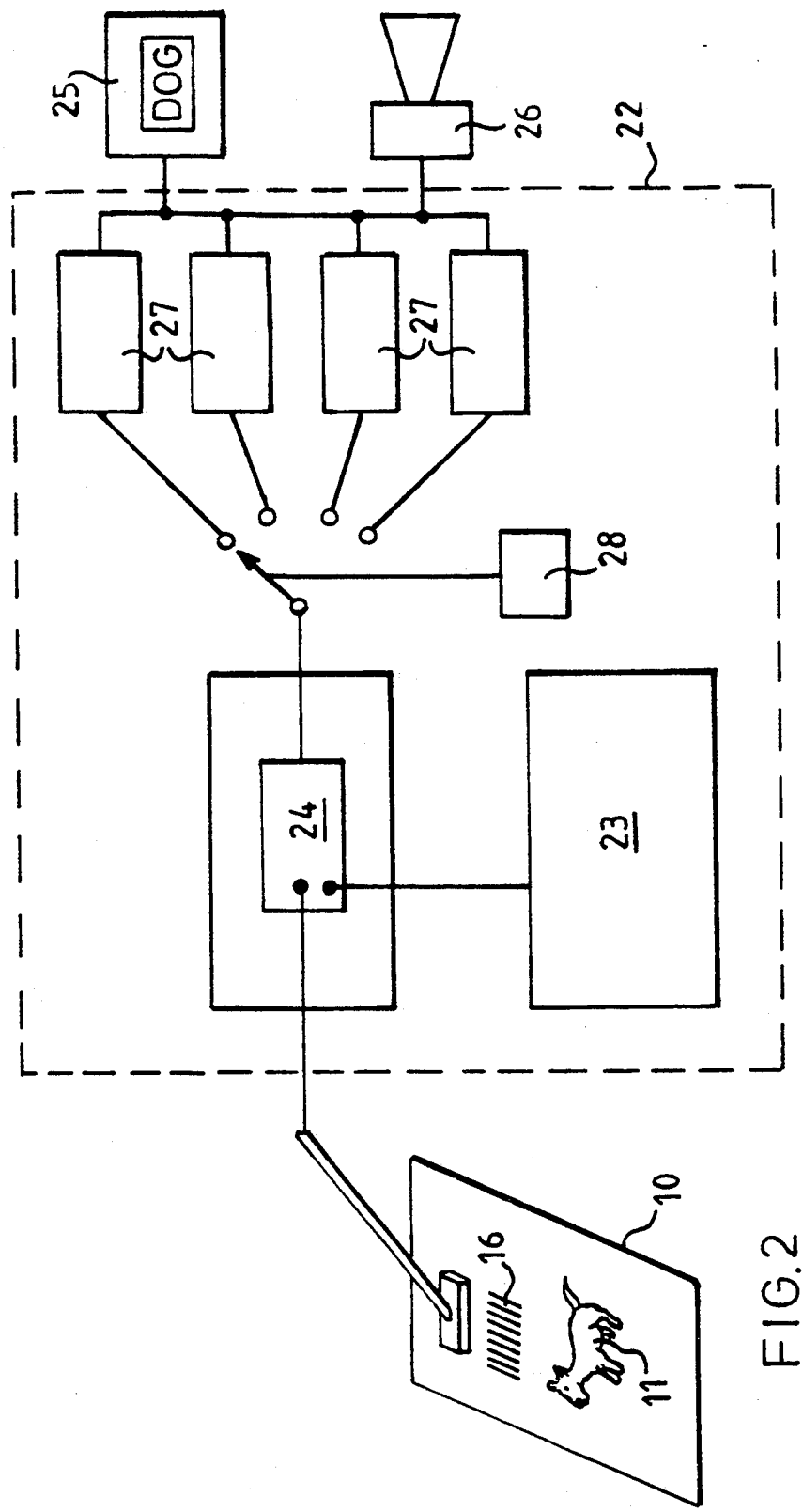
FIG. 2 is a block diagram of document data processing signals.

The document shown in FIG. 1 is a simplified representation of a street scene, containing a dog 11, a man 12, a car 13, a lamppost 14 and a church 15. Bar codes 16 are printed on the document on or alongside the respective representations. A bar code reader 21 (FIG. 2) is applied to one of the bar codes 16 and the output from the reader is compared in a microprocessor 22 with signals in a store 23 appropriate to the various objects represented. A comparison device 24 in the microprocessor selects the stored signal closest to the output from the bar code reader and the selected signal is applied to an LCD display 25 to display the word describing the selected object. Alternatively, a speech synthesizer 26 can be driven by the selected signal to generate the spoken word describing the selected object.

The device can be used to provide a vocabulary in different languages simply by changing the means for driving the LCD display or speech synthesizer from the selected signal. The microprocessor may be provided with a printed circuit board 27 for each of several languages, and means 28 may be provided in the microprocessor for selecting one of the boards so that the device operates in a selected language.

If it is desired that the representation on the document should not be obstructed by visible codes, such as the bar codes 16 mentioned above, invisible codes could be used, for example, those formed by magnetized strips, although some indication would have to be given on the document of the location where the code reader would have to be applied, for example, a coloured panel or box outline. The code reader would sense the magnetization pattern on the strip to provide an electrical signal similar in form to the output of the bar code reader.

The traditional bar code, as illustrated in the drawings, is a linear device and it is necessary for the code reader to move within a restricted range of angles in order to read it. According to another aspect of the invention there is provided a bar code in which the bars are arranged in a family of closed curves, one within the other, instead of straight lines as in the conventional code. With this arrangement, the reader can move in any direction across the code and provided that it passes through the innermost circle, it will be able to read the code correctly, irrespective of its direction of travel. Such a bar code has application not only to the particular arrangements already described, but also to any bar code situation.

Figure 3:
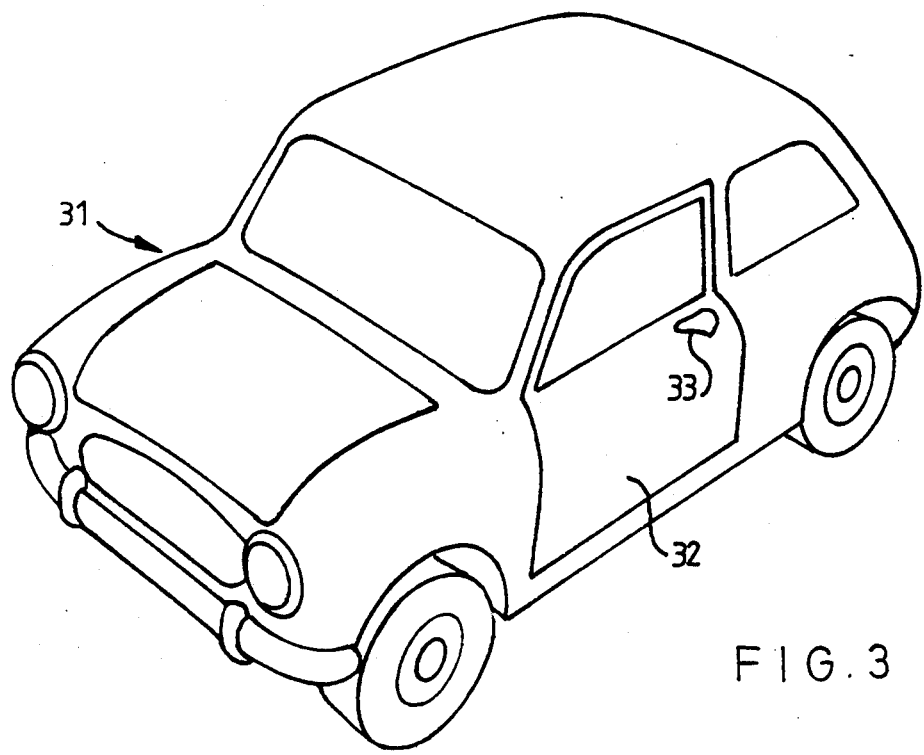
FIG. 3 is another document.
Figure 4:
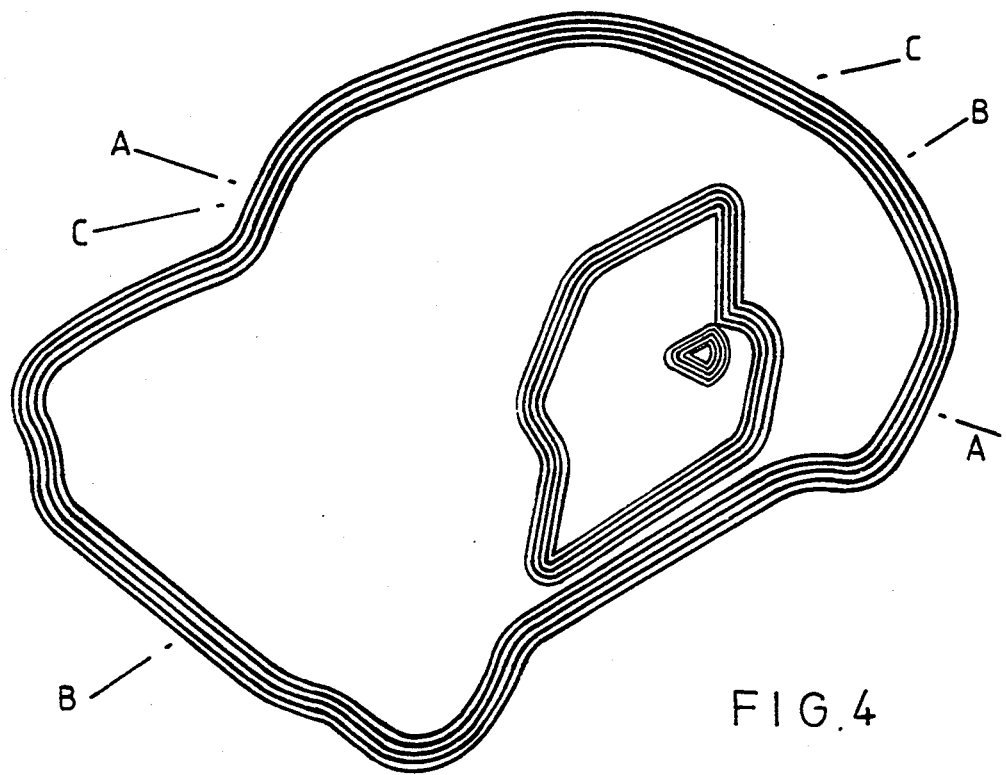
FIG. 4 is a code diagram corresponding to FIG. 3.

FIG. 3 shows the car 31 with a door 32 and a handle 33 on the door, as described above. FIG. 4 shows the closed ring codes used on the document to denote these components. These codes may be printed on the document or may be invisibly located on the document, for example, as magnetic patterns. Each code comprises a family of closed curves following the outline of the component—the width and spacing of the curves denoting the data of the code, as in a conventional bar code. The ring code for the handle 33 is located entirely within the ring code for the door 32 which itself is entirely within the ring code for the car 31.

A scan on line C—C of FIG. 4 will intersect the rings for the car 31 alone, and the display at 25/26 will thus relate to the car alone. A scan on line B—B will intersect the rings for the car 31 and the door 32 and so the display 25/26 will relate to a car door. A scan on line A—A will intersect all the rings and so the display 25/26 will relate to a car door handle.

With this arrangement the user does not have to worry about which code (or code location if the code itself is invisible) corresponds to the object and so there is no chance of an incorrect code selection.

I claim:

1. A device for identifying an object comprising:
   a graphic representation of an object; and
   an omnidirectional bar code representing information relative to said object, said bar code comprising a sequence of light and dark lines arranged as closed concentric curves having a shape corresponding to an outline of said object.

2. The device according to claim 1 wherein said omnidirectional bar code is invisible.

3. The device according to claim 1 further comprising graphic representations of components of said object, information relative to each of said components being represented by a respective omnidirectional bar code comprising a sequence of light and dark lines arranged as closed concentric curves having a shape corresponding to an outline of the component.

4. The device according to claim 3 wherein the respective omnidirectional bar codes are non-intersecting and positioned inside the bar code representing information relative to the object.

5. The device according to claim 3 wherein said object comprises a car and said components comprise a car door and a car door handle.

6. The device according to claim 1 further comprising
   means for reading said omnidirectional bar code to obtain information relative to said object; and
   a transducer for converting an output of said bar code reading means into a humanly detectable signal.

7. The device according to claim 6 wherein the transducer comprises a microprocessor including means for comparing the output of the bar code reading means with stored data relating to said object.

8. The device according to claim 6 wherein the transducer comprises an LCD display device and the humanly detectable signal comprises a visual display.

9. The device according to claim 6 wherein the transducer comprises a speech synthesizer and the humanly detectable signal comprises an audible sound.

* * * * *